United States Patent [19]
Keck et al.

[11] Patent Number: 5,382,856
[45] Date of Patent: Jan. 17, 1995

[54] GENERATOR ROTOR COLLECTOR TERMINAL STUD HYDROGEN SEAL

[75] Inventors: Richard J. Keck; Kirk G. O'Brien; Michael J. Bigelow, all of Schenectady, N.Y.

[73] Assignee: General Electric Co., Schenectady, N.Y.

[21] Appl. No.: 987,802

[22] Filed: Dec. 9, 1992

[51] Int. Cl.6 .................. H02K 11/00; H01B 17/26; H01B 17/58
[52] U.S. Cl. .......................... 310/71; 73/40; 174/152 R
[58] Field of Search .............. 73/40.5 R, 40, 40.7; 174/152 R; 310/55, 71, 61; 439/DIG. 912, DIG. 933

[56] References Cited

U.S. PATENT DOCUMENTS

| | | | |
|---|---|---|---|
| 3,172,670 | 3/1965 | Pras | 277/112 |
| 3,179,426 | 4/1965 | Duer | 277/112 |
| 3,353,043 | 11/1967 | Albright | 310/61 |
| 3,524,090 | 8/1970 | Sark | 310/71 |
| 3,670,092 | 6/1972 | Updyke et al. | 174/152 R |
| 3,733,502 | 5/1973 | Curtis et al. | 310/61 |
| 3,829,546 | 8/1974 | Hunter et al. | 264/262 |
| 4,066,921 | 1/1978 | Blank | 310/61 |
| 4,155,019 | 5/1979 | Weghaupt | 310/61 |
| 4,300,066 | 11/1981 | Butler, III | 310/53 |
| 4,369,386 | 1/1983 | Lurie et al. | 310/54 |
| 4,389,585 | 6/1983 | Yamaguchi et al. | 310/52 |
| 4,394,593 | 7/1983 | Gocho | 310/54 |
| 4,471,249 | 9/1984 | Okamoto et al. | 310/61 |
| 4,558,874 | 12/1985 | Williams et al. | 277/112 |
| 4,577,873 | 3/1986 | Baumann | 277/110 |
| 4,647,050 | 3/1987 | Johnson | 277/19 |
| 5,015,895 | 5/1991 | Obley | 310/71 |

*Primary Examiner*—R. Skudy
*Assistant Examiner*—D. R. Haszko
*Attorney, Agent, or Firm*—Nixon & Vanderhye

[57] ABSTRACT

A collector terminal and hydrogen seal assembly for insertion within a radial hole in a generator rotor and connectable to a conductor bar located within an axial bore formed in the rotor, the seal assembly comprising a substantially cylindrical terminal stud portion having threaded upper and lower sections and a smooth intermediate section; insulation wrapped about the intermediate section; a spacer block located between the seal elements and defining an annular space surrounding the insulation; and a conduit in the terminal stud adapted to introduce compressed air from outside the generator rotor to the annular space for testing the integrity of the seal elements.

20 Claims, 3 Drawing Sheets

GENERATOR ROTOR COLLECTOR TERMINAL STUD HYDROGEN SEAL

The present invention relates generally to turbine generators and, more specifically, to a hydrogen seal for the collector terminals of a hydrogen cooled generator.

BACKGROUND AND SUMMARY OF THE INVENTION

In a synchronous AC generator, DC current (DC) flows in the copper windings of the rotating generator field. These windings are embedded in the slots in the magnetic steel rotor forging. The rotating magnetic field which is produced induces alternating (AC) voltage in the stationary armature winding of the generator. In turn, AC current flows in the armature winding, out of the generator terminals and to the power system.

In one conventional arrangement, spring loaded carbon brushes pass the DC current to two collector rings mounted on the end of the generator rotor shaft, one ring for supplying current to the rotating generator field, and the other for extracting current from the field. Associated with each collector ring is one or more collector terminals and one conductor or connection bar. The connection bar, located in the bore hole on the axial center line of the rotor forging, extends axially between the main field winding and the collector rings. Threaded connections are used at both ends of the collector terminal to conduct the current to the mating parts. The connection bar conducts current to the main field winding terminal which is also threaded into the connection bar. The main field winding terminal in turn conducts current between the connection bar and the brazed connection to the generator field winding. Radial holes are drilled in the rotor forging to accommodate the collector terminals and the main field winding terminals.

To improve cooling efficiency on larger generators, the generator field winding may be cooled by hydrogen which is contained by the generator frame. The carbon brushes and collectors on the end of the generator shaft, however, are located in an air environment, and therefore seals are required to prevent hydrogen from leaking along the path created by the collector terminals, connection bar and main field winding terminals.

One conventional technique for sealing the terminal holes and bore hole in a generator rotor is described below, in conjunction with FIGS. 2 and 3. Initially, however, reference is made to FIG. 1 for an understanding of the overall machine configuration. While FIG. 1 illustrates collector terminals in accordance with this invention (as described in detail further herein), other components of the machine are known. Thus, a turbine generator 10 includes a rotor 12, having a central bore 14 through which a conductor or connection bar 16 extends from a main terminal stud 18 to a pair of collector terminal studs 20, 22 (these studs, as noted above, are constructed in accordance with this invention) Mirror image conductor and terminal studs are provided 180° from the terminals shown in the drawings, as will be appreciated by those skilled in the art.

The main field terminal winding 24, held by retaining ring 26 is connected to the main terminal stud 18 via connector 28 brazed to the winding at 30. The lower end of the terminal stud 18 is threaded into the connector bar 16 at 32.

At the collector end of rotor 12, spring loaded carbon brushes (not shown) pass DC current to collector rings 34, 36 mounted on the rotor at axially spaced locations. A bore plug 38 closes the collector end of the rotor 12.

With reference to FIG. 2, a known main terminal connector 40 comprises a stud 42 threaded at an upper end 44 and lower end 46. The lower end 46 is threadably received in the connector bar 16'. A terminal bushing 48 surrounds the lower portion of the stud 42 and a reduced diameter portion 50 extends upwardly within a countersunk portion 52 of the rotor 12'. The shoulder or seat 54 of the countersunk portion 52 receives a bottom seal bushing 56 which is slidably received over the smooth (non-threaded) surface of the reduced diameter portion 50. A chevron-type (synthetic rubber) seal or gasket 58 is also slidably received over the same surface and is supported by the bushing 56. A steel nut 60 threadably received over the threaded exterior surface of reduced diameter portion 50, is utilized to compress the seal 58 from its chevron-shape (shown in phantom) to a flat sealing configuration (shown in solid).

The upper end 44 of the stud 42 receives the connector lead 62 between upper and lower copper nut halves 64, 66, enclosed within upper and lower halves of an insulating cap 68.

The above described known main terminal construction has been used in conjunction with a collector terminal 70 as shown in FIG. 3 and which includes a terminal stud 72 threaded at upper and lower ends 74, 76 with a smooth intermediate portion 78. An insulating sleeve 80 surrounds the intermediate portion 78, while lower end 76 is threadably secured to the connector bar 16'. Upper end 74 receives a steel nut 82, an inner copper nut 84, a distributing ring 86 and an outer copper nut 88. Within a multi-stepped bore of the rotor 12', the insulating sleeve 80 receives a bottom seal washer 90, a bevelled gasket 92, steel gasket bushing 94, spring washers 96, 96', steel nut 98 and potting compound 100. It will be appreciated that the steel nuts 82 and 98 are threaded within threaded portions of the multi-stepped bore of the rotor 12', and that as nut 98 is tightened, gasket 92 will be compressed against the sleeve 80 and a bevelled shoulder 102 of the multi-stepped bore in the rotor 12'.

In this known arrangement, the bore plug 38 is provided with a hole and a pipe tap leading to an air tank. In this way, the bore of the rotor 12' can be pressurized and, if the pressure within the bore remains constant over a predetermined period of time (e.g., an hour), the hydrogen seals established by connectors 40 and 70, and particularly collector terminal 70, are presumed effective. In the above described known arrangement, the otherwise unnecessary hydrogen seal established by the main seal connector is required to test the integrity of the collector terminal hydrogen seal. In other words, if no seal were incorporated into the main terminal connector, then the pressurized air used to test the collector terminal would leak from the unsealed main terminal connector, rendering the test procedure ineffective.

After the seals are approved by testing for leakage, a pipe plug with a special epoxy applied to the threads is screwed into the bore plug.

In another conventional arrangement (not shown), utilized with medium size steam turbine generator rotors, collector terminals are not used to conduct the current from the collector ring to the bore conductor or connection bar. Rather, copper leads are connected to the end of the connection bar and are brought out the end of the bore hole. These leads are then routed around the end of the generator shaft and axially back to the collector ring along the outside of the shaft. Synthetic rubber seals are lubricated and then placed in a glass plug. The plug assembly is then slid between the rotor bore and the copper connection bar. There are a series of seals to both seal against the steel rotor and the copper connection bar. The seals are made so there will be an interference fit between the seals and their mating parts, while lubricant is used to facilitate the assembly. In this arrangement, it is the assembled interference that makes the seals effective. In this regard, the glass plug has a hole which stops between the front and back seals and there is a pipe tap at the outside opening. An air tank line is threaded into the pipe tap so the area between the seals can be pressurized to a specified amount, and if there is no more than, for example, a pound of pressure drop in about an hour, then the seals are approved for service. After the seals are approved, a pipe plug with a special epoxy applied to the threads is screwed into the glass plug.

The principal object of the present invention is to effectively create a simplified hydrogen seal at the generator collector terminals, which will also eliminate the need for a second hydrogen seal at the generator field winding terminals. Another object of the invention is to create such a seal so that it will be reliable in use, and so that, prior to use, it will accommodate a simple test of the integrity of the seal following assembly.

In an exemplary embodiment of the invention, an insulated copper collector terminal stud, threaded at upper and lower ends, is located within a multi-stepped radial hole in the rotor in the conventional manner. The stud, however, has a hole bored through its center and is provided with a ¼ inch—18 pipe tap at the upper end of the stud. The hole terminates approximately midway along the axial length of the stud where it communicates with a radial hole extending from the center bore to the side wall. The smooth intermediate portion of the copper stud is wrapped with insulation and machined to size in order to reach the required surface finish to insure proper sealing. The insulation is drilled to maintain the radial hole open.

A steel nut, which will provide the external force necessary to squeeze a pair of synthetic rubber seals, is received over the upper end of the stud and threaded into a threaded portion of the rotor hole. The radial rotor hole is larger in diameter than the stud so that the stud is slidably received in the radial rotor hole and threaded directly into the connector bar. Within the larger diameter portion of the radial rotor hole, and supported by a lowermost shoulder therein, the insulated stud receives, in sequence, from an inner end (i.e., closest the connector bar), a seal washer, a first synthetic rubber sealing ring, a spacer block, a second synthetic sealing ring, a flat bushing, a spring washer and the steel nut. A potting compound fills the remaining space between the stud and the exterior surface of the rotor, while a threaded end of the stud protrudes beyond the rotor for securing the collector distribution ring in a manner similar to that described above in conjunction with FIG. 3. The spacer block includes a radial hole which is aligned with the radial holes in the insulation and the stud so that air under pressure may be introduced into the area between the two synthetic rubber seals, thereby enabling the integrity of the seal to be tested prior to use.

The steel nut, which is threaded on its exterior for mating engagements within a threaded portion of the radial rotor bore, is adapted to be tightened within the bore, thereby applying axial compression to the synthetic rubber seals about the spacer block. At the same time, the spring washer will insure a constant force on the nut and on the synthetic rubber seals thereby preventing the nut from backing out of the bore. The flat bushing is employed to provide a uniform contact surface on the synthetic rubber seal against the action of the steel nut. The seal washer at the lowermost end of the bore is a guide for the synthetic-rubber seal and aids in sealing against the insulated copper stud.

The synthetic rubber seals are preferably rectangular in cross section with specific material properties for hardness and electrical resistance.

There are several advantages to the above described embodiment. For example, if the terminal stud is assembled so that it is not centered in the terminal hole, the spacer block and the flat bushing can be easily modified or replaced to suit the alignment. In addition, while the rotor cannot be modified easily, clearance must be built in to accommodate the terminal stud within the terminal hole of the rotor. The seal washer is designed so that its inside diameter approximates the collector terminal stud outside diameter (within 0.010 inch). The outside diameter has substantial clearance with respect to the inside diameter of the rotor surface (0.10 inch) so that when there is misalignment, the stud can be assembled while the seal still has a support to guide it when it is squeezed. In addition, by creating a double seal at the collector terminal, integrity tests for the seal may be carried out without having to rely on a main terminal seal for providing a closed system. Thus, the need for a hydrogen seal at the main terminal connection is eliminated.

Accordingly, in its broadest aspect, the present invention relates to a collector terminal stud for insertion within an at least partially threaded bore in a generator rotor, and which prevents escape of gas from within the rotor through the bore comprising a substantially cylindrical terminal stud portion having threaded upper and lower sections and a smooth intermediate section; insulation wrapped about the intermediate section; and a pair of compressible seal elements received over the insulation, said compressible seal elements in engagement with and separated by a relatively rigid spacer block; and means on either side of the compressible seal elements for exerting a compressive force on the pair of compressible seal elements.

The above described invention is less costly, more easily assembled/disassembled and in addition, permits greater tolerances between the terminal stud and the rotor bore. Further, the invention provides superior seal geometry when compared to the current medium size generator or double seal design.

Other objects and advantages of the present invention will become apparent from the detailed description which follows.

DETAILED DESCRIPTION OF THE DRAWINGS

Figure 4:
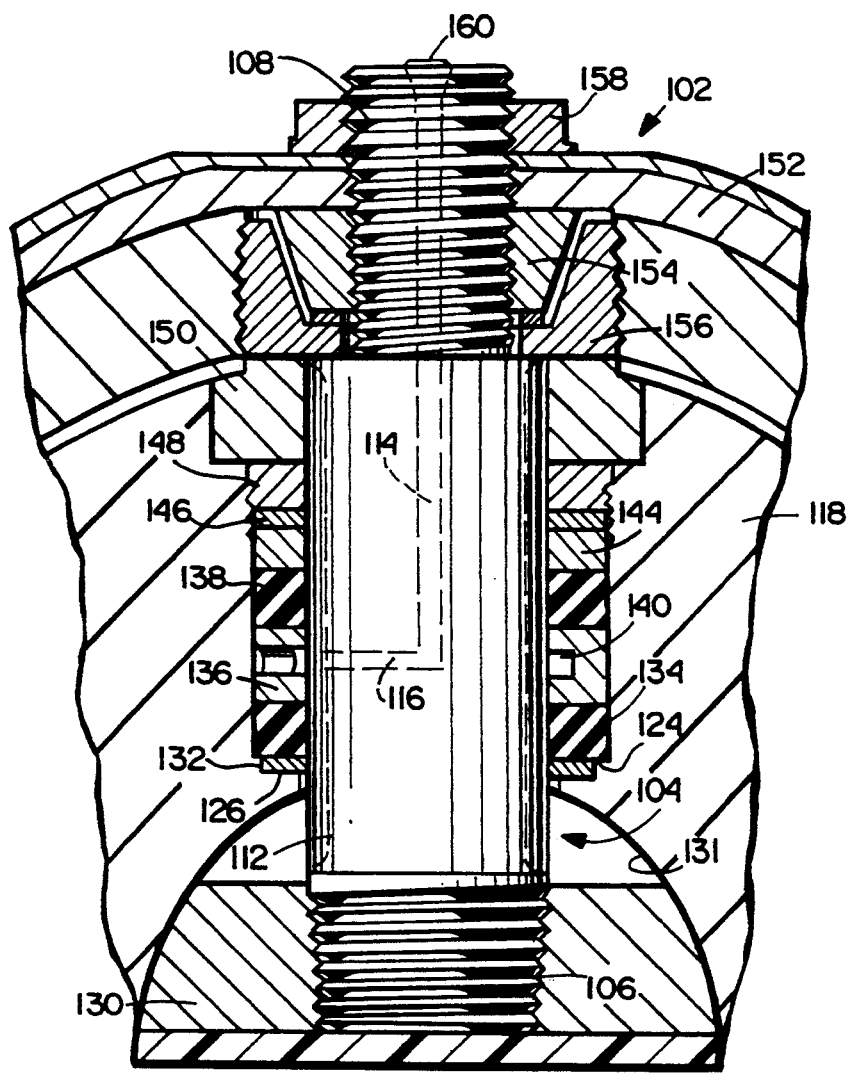
FIG. 4 is a partial sectional end view of a collector terminal hydrogen seal assembly in accordance with an exemplary embodiment of this invention.
Figure 5:
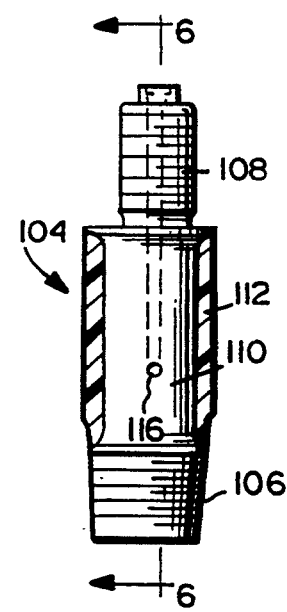
FIG. 5 is a side view, partially in section, of the terminal stud utilized in the assembly shown in assembly FIG. 4 with insulating sleeve installed.
Figure 6:
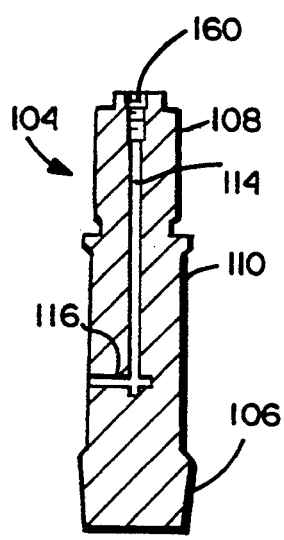
FIG. 6 is a side section of the stud shown in FIG. 5, with insulating sleeve removed.

With reference now to FIGS. 4-6, the collector terminal stud assembly 102 in accordance with this invention includes a (preferably copper) stud 104 having a threaded lower end 106, a threaded upper end 108 and a smooth intermediate portion 110, the latter wrapped with an insulating sleeve 112. Upper end portion 108 has a reduced diameter relative to the intermediate and lower portions 106 and 11. The stud 104 is also formed with an axially extending bore 114 extending from upper end 108 to a location between the ends of the intermediate portion 110 where bore 114 connects with a radial hole 116 leading out of the stud.

The rotor 118 is formed with a multi-stepped, radial hole or bore 120 including shoulders 122, 124 and 126. The lowermost portion 128 of hole 120 is sized only slightly larger than the stud 104 including the insulating sleeve 112. The stud 104 is slidably mounted in hole or bore 120 and threaded directly into the connector bar 130 located within the rotor axial bore 131. Lowermost shoulder 126 supports a seal washer 132 while adjacent shoulder 124 supports a first sealing ring 134. The latter supports a relatively rigid spacer block 136 which, in turn, supports a second sealing ring 138. Thus, rings 134 and 138 (which may be synthetic rubber or other suitable material) sandwich the spacer block 136. Spacer block 136 (see also FIGS. 10 and 11) is provided with an interior chamber 140 connected to a radial hole 142. The chamber 140 and hole 142 communicate with the radial hole or bore 116 in the stud 104, for a purpose explained in greater detail below.

The second sealing ring 138 supports a flat bushing 144 and a spring washer 146. The bore 120 is threaded at its upper end, just below shoulder 122 for threadably receiving a steel nut 148 which may be threaded within the upper portion of bore 120. It will be appreciated that elements 132, 134, 136, 138, 144, 146 and 148 have substantially identical interior or inside diameters which allow such elements to be slidably (but snugly) received over the insulating sleeve 112. Exterior diameters are also similar with the exception of seal washer 132 and steel nut 148 (the latter threaded on its exterior surface to mate with the threads at the upper end of bore 120.

Figure 1:
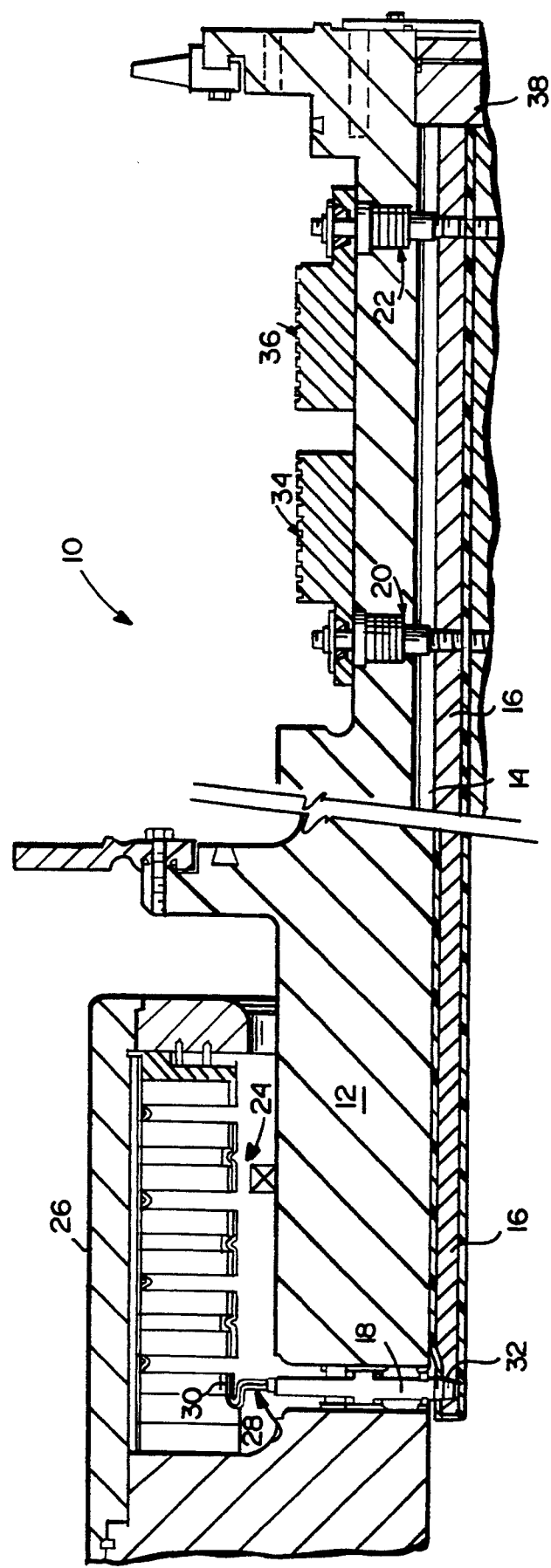
FIG. 1 is a partial section of a generator illustrating the location of a main terminal stud and a collector terminal stud in a conventional medium size generator.
Figure 2:
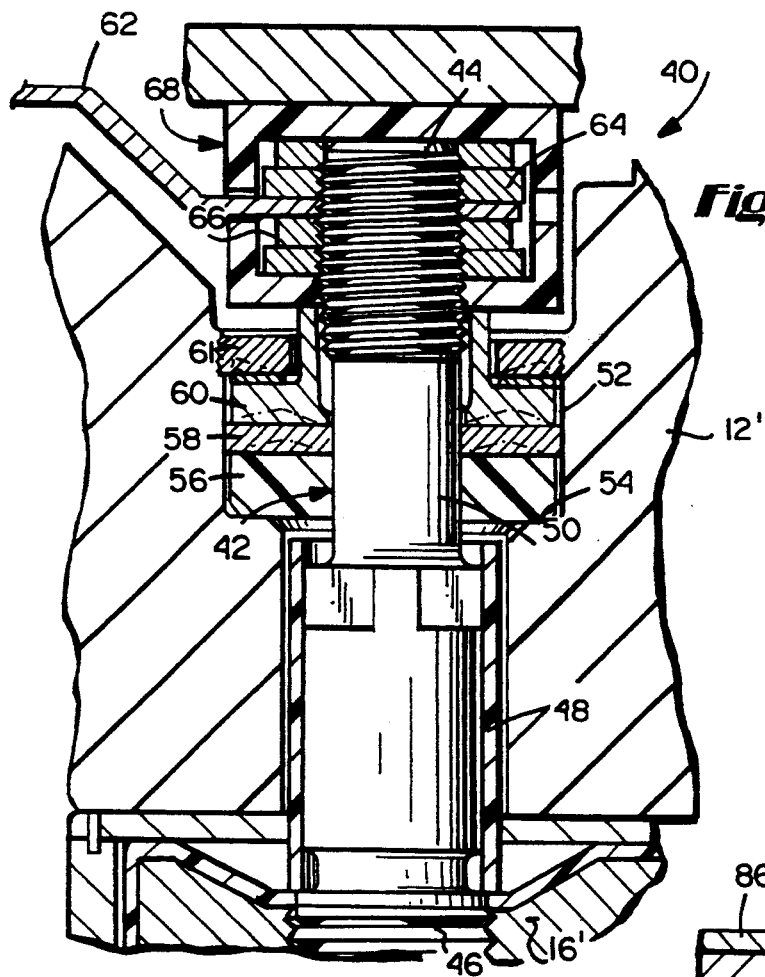
FIG. 2 is a partial sectional end view of a known main terminal hydrogen seal assembly.
Figure 3:
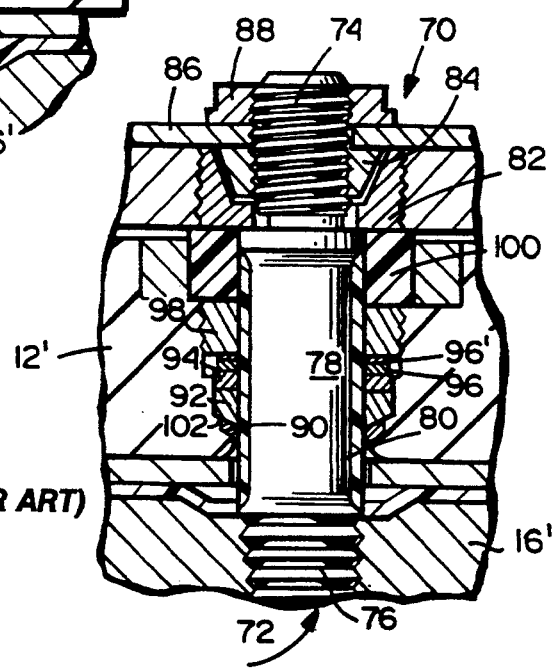
FIG. 3 is a partial sectional end view of a known collector terminal hydrogen seal assembly.

Above the nut 148, any remaining space in hole or bore 120 is filled with a suitable potting compound 150. The upper threaded end portion 108 is similar to the arrangement in FIG. 3 in that connector lead 152 is received between inner and outer copper nuts 154, 156, while steel nut 158 secures the entire seal assembly in place.

During assembly, steel nut 148 is tightened to thereby compress sealing rings 134, 138 against the rotor bore 120, the insulating sleeve 112, and the spacer block 136 to thereby create the desired hydrogen seal. To test for seal integrity, an air tank line is threaded in the pipe tap 160 in the stud 104 and compressed air introduced into the chamber 140 via axial bore 114 and communicating radial hole 116. As will be appreciated from FIG. 4, pressurized air will be trapped between the upper and lower seals 138, 134 and if no pressure is lost over a predetermined time—such as an hour, the collector seal assembly is approved for service. Thereafter, the pipe tap is closed and sealed with an appropriately sized plug (with special epoxy compound applied to its threads).

In operation, when the generator is pressurized, hydrogen will flow into the region occupied by the connection bar 130 and will attempt to leak past the collector terminal. Here, the double seal arrangement will prevent any such leakage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A collector terminal stud for insertion within an at least partially threaded bore in a generator rotor, and which prevents escape of gas from within the rotor through the bore comprising:
   a substantially cylindrical terminal stud portion having threaded upper and lower sections and a smooth intermediate section;
   a pair of compressible seal elements received over said insulation, said compressible seal elements in engagement with and separated by a relatively rigid spacer block; and means on either side of said compressible seal elements for exerting a compressive force on said pair of compressible seal elements.

2. The collector terminal stud of claim 1 wherein said compressive force exerting means comprises in part an exteriorly threaded nut receivable over said stud portion and threadable within the partially threaded bore of the generator rotor.

3. The collector terminal of claim 2 wherein said pair of compressible seal elements comprises an upper seal and a lower seal, wherein a spring washer and a bushing are sandwiched between said nut and said upper seal.

4. The collector terminal of claim 3 wherein said compressive force exerting means also comprises a seal washer below said lower seal, adapted to seal on an annular shoulder formed in the partially threaded bore.

5. The collector terminal of claim 1 and further including means for introducing a gas through said stud portion and relatively rigid spacer block to a chamber in said relatively rigid spacer block to test integrity of said pair of compressible seals.

6. The collector terminal stud of claim 5 wherein said compressive force exerting means comprises in part an exteriorly threaded nut receivable over said stud portion and threadable within the partially threaded bore of the generator rotor.

7. The collector terminal of claim 5 wherein said pair of compressible seal elements comprises an upper seal and a lower seal, wherein a spring washer and a bushing are sandwiched between said nut and said upper seal.

8. The collector terminal of claim 5 wherein said compressive force exerting means also comprises a seal washer below said lower seal, adapted to seal on an annular shoulder formed in the partially threaded bore.

9. The collector terminal of claim 5 wherein said means includes a center bore hole in said stud in communication with a radial hole communicating with said chamber.

10. A generator including a rotor; a conductor extending through an axial bore in said rotor; a collector ring assembly mounted on said rotor; and a collector terminal stud extending between said collector assembly and said conductor, through a partially threaded bore in said rotor; said partially threaded bore having at least one annular shoulder located proximate to said conductor, said terminal stud comprising
- a substantially cylindrical terminal stud portion having threaded upper and lower sections and a smooth intermediate section;
- insulation wrapped about said intermediate section;
- a pair of compressible seal elements received over said insulation, said compressible seal elements in engagement with and separated by a relatively rigid spacer block; and means on either side of said compressible seal elements for exiting a compressive force on said pair of compressible seal elements; and
- means for introducing a gas through said stud portion and relatively rigid spacer block to a chamber in said relatively rigid spacer block to test integrity of said compressible seals.

11. The generator of claim 10 wherein said compressive force exerting means comprises in part an exteriorly threaded nut receivable over said stud portion and threadable within a bore formed in the partially threaded bore of the generator rotor.

12. The generator of claim 11 wherein a pair of compressible seal elements comprises an upper seal and a lower seal, wherein a spring washer and a bushing are sandwiched between said nut and said upper seal.

13. The generator of claim 12 wherein said compressive force exerting means also comprises a seal washer below said lower seal, adapted to seat on said annular shoulder formed in the partially threaded bore.

14. The generator of claim 13 wherein said rotor is cooled by hydrogen passing through said axial bore.

15. A collector terminal and hydrogen seal assembly for insertion within a radial hole in a generator rotor and connectable to a conductor bar located within an axial bore formed in the rotor, the seal assembly comprising:
- a substantially cylindrical terminal stud portion having threaded upper and lower sections and a smooth intermediate section;
- insulation wrapped about said intermediate section;
- a pair of compressible seal elements received over said insulation;
- a relatively rigid spacer block located between said compressible seal elements and incorporating an annular chamber surrounding said insulation; and
- a conduit in said terminal stud adapted to introduce compressed air from outside said generator rotor to said annular chamber for testing the integrity of said compressible seal elements.

16. The terminal and hydrogen seal assembly of claim 15 wherein said seal elements comprise synthetic rubber.

17. The terminal and hydrogen seal assembly of claim 15 wherein said compressive force exerting means comprises in part an exteriorly threaded nut receivable over said stud portion and threadable within the partially threaded bore of the generator rotor.

18. The terminal and hydrogen seal assembly of claim 15 wherein a pair of compressible seal elements comprises an upper seal and a lower seal, wherein a spring washer and a bushing are sandwiched between said nut and said upper seal.

19. The terminal and hydrogen seal assembly of claim 15 wherein said compressive force exerting means also comprises a seal washer below said lower seal, adapted to seal on an annular shoulder formed in the partially threaded bore.

20. The terminal and hydrogen seal assembly of claim 15 wherein said conduit extends axially from said threaded upper section to said intermediate section and extends radially through said intermediate portion.

* * * * *